July 24, 1962

F. O. E. SCHULTZ 3,046,003

FLUID SPRING

Filed July 16, 1959

INVENTOR.
FORREST O. E. SCHULTZ
BY
Irvin L. Groh
ATTORNEY.

July 24, 1962

F. O. E. SCHULTZ 3,046,003

FLUID SPRING

Filed July 16, 1959

INVENTOR.
FORREST O. E. SCHULTZ
BY

ATTORNEY.

July 24, 1962  F. O. E. SCHULTZ  3,046,003
FLUID SPRING
Filed July 16, 1959  3 Sheets-Sheet 3

INVENTOR.
FORREST O. E. SCHULTZ
BY
ATTORNEY.

United States Patent Office 3,046,003
Patented July 24, 1962

3,046,003
FLUID SPRING
Forrest O. E. Schultz, Owosso, Mich., assignor to Midland-Ross Corporation, Cleveland, Ohio, a corporation of Ohio
Filed July 16, 1959, Ser. No. 827,562
15 Claims. (Cl. 267—65)

This invention relates to fluid springs and particularly to fluid springs for use in vehicles to support a body relative to its running gear.

Although a cushion of fluid, such as air, has long been considered as the ideal suspending means for vehicles, air suspension systems as presently used have a great number of deficiencies. Air for the entire system is drawn from the atmosphere, compressed at some central location and delivered to a tank for storage. From the tank, air is delivered as needed to separate air springs associated with each of the wheels. When excessive air exists in the springs, it is released to the atmosphere. In many systems, the need for more air in the springs or the release of excess air is under the control of a so-called leveling valve which responds to the relative position of the body and axle to determine the air requirements of the spring. Such systems require a labyrinth of air tubes, valves and other mechanism which is expensive to manufacture and install. Furthermore, a defect in a portion of the system may disable all of the springs in the suspension system. In addition, the use of the atmosphere as a part of the air circuit introduces moisture into the suspension system. The moisture is not easily expelled and it remains to damage sensitive valve parts or to freeze and to prevent operation of moving parts.

The present invention eliminates these problems by a novel arrangemnet which utilizes a fixed quantity of air circulated through a closed circuit so that an extensive piping arrangement, compressor air storage tank, and leveling valves are not required.

It is a general object of the invention to provide a self-contained air spring for supporting a wide range of loads at a mean height.

It is another object of the invention to provide an air spring which includes its own air supply and valve means for metering the air from the supply to a load-supporting portion of the spring.

It is still another object of the invention to provide a self-contained air suspension device in which means are provided for supporting a suspended mass at a constant height above the unsprung mass independently of the load.

Additionally, it is an object of the invention to provide an air spring which acts as a complete, self-contained air suspension in which a pump operates in response to relative movement of the suspended and unsuspended structures to maintain a supply of air available for supplying the load-bearing portion of the system.

It is still another object of the invention to use a captive quantity of air in a closed air circuit to vary the pressure according to changes in load in a load-supporting chamber.

These and other objects and advantages are attained by the present invention, various novel features of which will be apparent from the following description and from the accompanying drawings disclosing a preferred embodiment of the invention.

Referring to the drawings.

Figure 5:
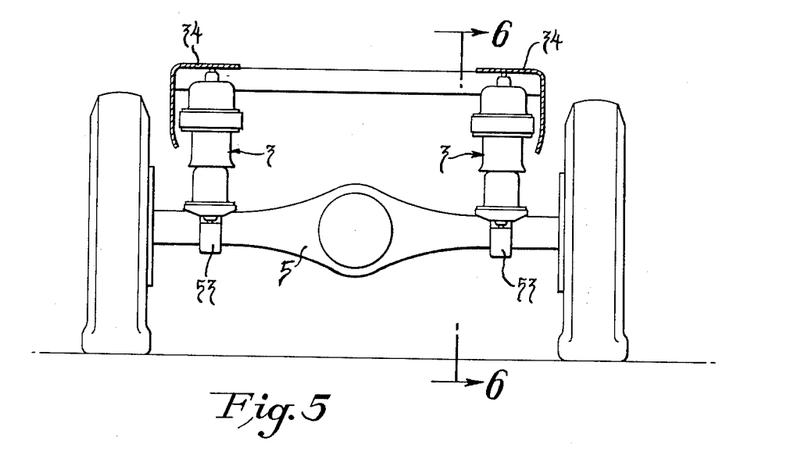
FIG. 5 is an end view of a vehicle, diagrammatically showing fluid spring units in use with the rear axle of a vehicle.
Figure 6:
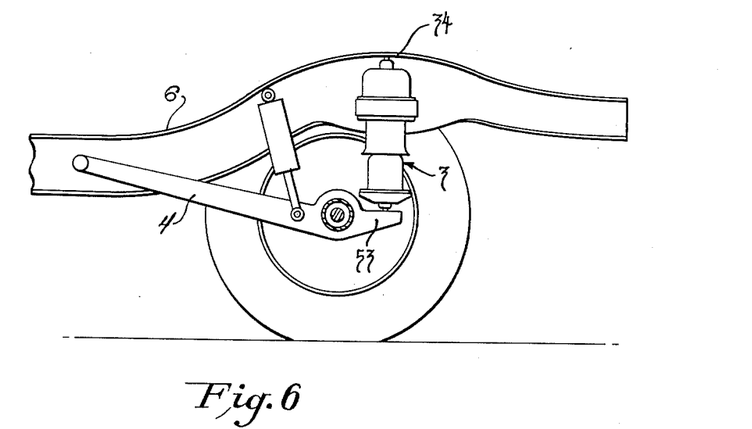
FIG. 6 is a side view of the structure shown in FIG. 6 and taken on line 5—5 in the figure.

The embodiment of the fluid spring shown in the drawings is adapted for support between sprung and unsprung portions of various types of structures but is particularly adapted to support the body of a vehicle relative to its axles. As seen in FIGS. 5 and 6, an air spring 3 is associated with each wheel with its lower portion connected to a radius arm 4 attached to the vehicle axle housing 5 and its upper portion connected to a frame 6. The springs 3 supports the frame 6 relative to the axle 5 in much the same manner as conventional leaf or coil springs.

An understanding of the invention will be facilitated by thinking of the air-spring 3 as including three separate air chambers each of which is connected to the other two chambers to form a closed air circuit. One of the three chambers is deformable and acts to support the spring portion or frame 6 at a constant height relative to the unsprung portion or axle 5 independently of the load on the frame. One of the remaining chambers acts as an air supply and the other as an air receiver. In order to maintain the sprung and unsprung portions at a constant spacing relative to each other, the air pressure in the deformable chamber is raised when the load increases and is reduced when the load decreases. This is accomplished by admitting air from the supply chamber and by exhausting air to the receiver chamber as the need arises through a control valve which operates in response to relative movement of the sprung and unsprung portions. To maintain a continuous supply of air available, air is pumped from the receiver chamber to the supply chamber as the body and axle move relative to each other.

All of the mechanism and chambers, including the valving and pumping mechanism, are incorporated in a single enclosed unit which is sealed from the atmosphere.

Figure 1:
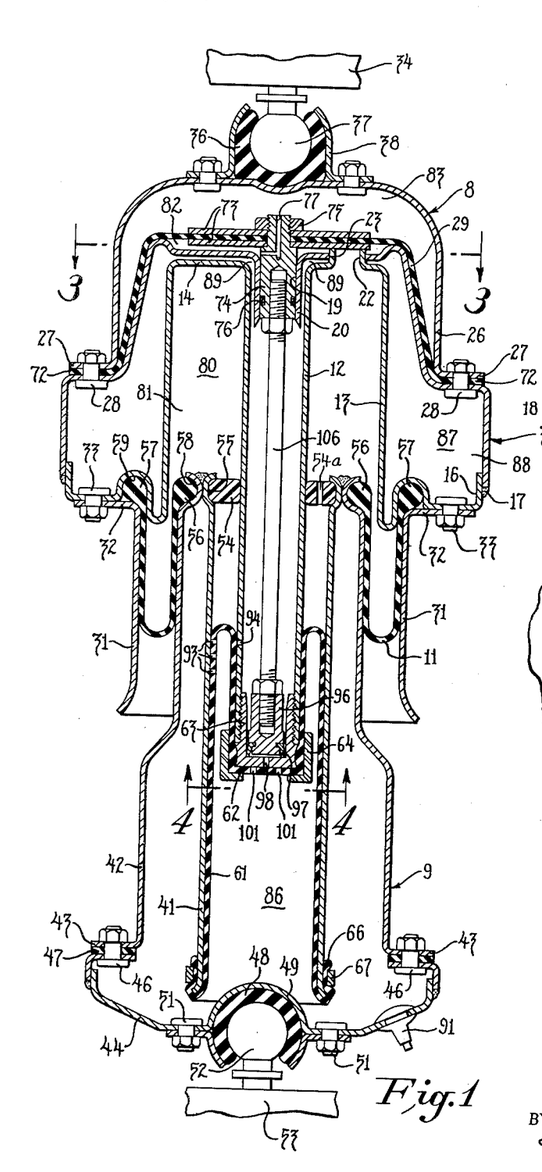
FIG. 1 is a side elevation showing the fluid spring embodying the invention in cross-section.
Figure 3:
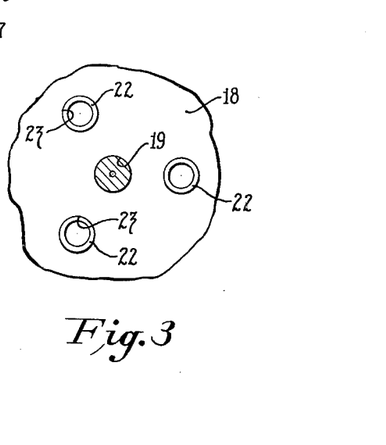
FIG. 3 is a partial cross-sectional view taken on line 3—3 in FIG. 1.

More specifically, the air chambers, the pump mechanism and valving arrangement which make up each spring unit, are formed of a number of stamped metal parts and flexible diaphragms. As shown in FIG. 1, the spring 3 includes an upper housing 8 and a lower housing 9 formed of sheet metal stampings joined together by a diaphragm 11. A portion of the upper housing 8 is formed by an elongated tubular member 12, the upper end of which is surrounded by another tubular member 13 of relatively large diameter. The upper ends of the tubular members 12 and 13 are joined by an upper end wall 14. The lower end of the tubular member 13 is formed with a flange 16 which is welded as at 17 to an inverted cup-shaped part 18. The cup-shaped part has a central aperture 19 formed by a collar 20 which is located in spaced relation to the inner wall of the tubular member 12. The end wall 14 is provided with a plurality of openings which are formed by collars 22 extending upwardly through similarly arranged openings 23 in the bottom of the inverted cup-shaped part as seen in FIG. 3. The joints around the openings 23 and collar 22 are welded to make them fluid tight. This together with the weld at 17 makes the tubular member 12 and 13 and the cup-shaped part 18 into a rigid structure.

A second inverted cup 26 fits over the top of the cup 18 and is provided with a flange 27 which is fastened to the lower inverted cup 18 by means of bolts 28 which also act to clamp the circumference of a diaphragm 29 between the cups 18 and 26 to form a fluid tight joint. A downwardly extending skirt 31 of generally tubular shape and having an upper flange 32 is fastened to the flange 16 by bolts 33. The upper inverted cup 26 is provided with means for fastening the upper housing 8 to the sprung body member 34. In this particular case, the means is formed by a resilient socket 36 adapted to receive a ball 37 rigidly connected to the sprung body 34. The resilient socket securely grips the ball 37 through a metallic sheath 38 which is bolted to the upper inverted cup 26.

The lower housing member 9 is formed of a pair of coaxially disposed tubular members 41 and 42 which are spaced from one another and are joined at the upper ends by means of welding. The outer tubular member 42 is provided with a flange 43 adjacent its lower end which is fastened to a dished cover 44 by bolts 46. A gasket 47 between the flange 43 and cover 44 affords a fluid tight seal. A resilient ball socket 48 is fastened to the dished member 44 by means of a metallic sheath 49 and bolts 51. The socket 48 receives a ball 52 which is rigidly connected to an unsprung member 53, such as that associated with an axle 5 of a vehicle.

The upper housing 8 and lower housing 9 are joined together by the diaphragm 11 which is made of resilient material reinforced by fabric. The diaphragm is generally tubular, prior to installation, and one end is provided with a bead 56 which has a smaller diameter than a bead 57 at the other end. The smaller bead 56 fits into an annular groove 58 formed in the tubular member 42 and is held in that position due to the limited resiliency of the diaphragm beads. The other bead 57 fits into an annular groove 59 formed in the flange 16 and is clamped in position by the flange 32 on the skirt 31 by means of bolts 33. Diaphragm 11 acts as a movable wall joining the housings 8 and 9 together so that they form a completely enclosed air containing unit which permits the upper and lower housings to move relative to each other. It will be noted that ample space is provided for the upper ends of the tubular members 41 and 42 to telescope into the annular space between the tubular portions 12 and 13. To keep the tubular members 12 and 41 aligned relative to each other, a nylon ring 54 is fitted in a groove 55 to act as a bearing relative to the tube 12.

Figures 2, 4:
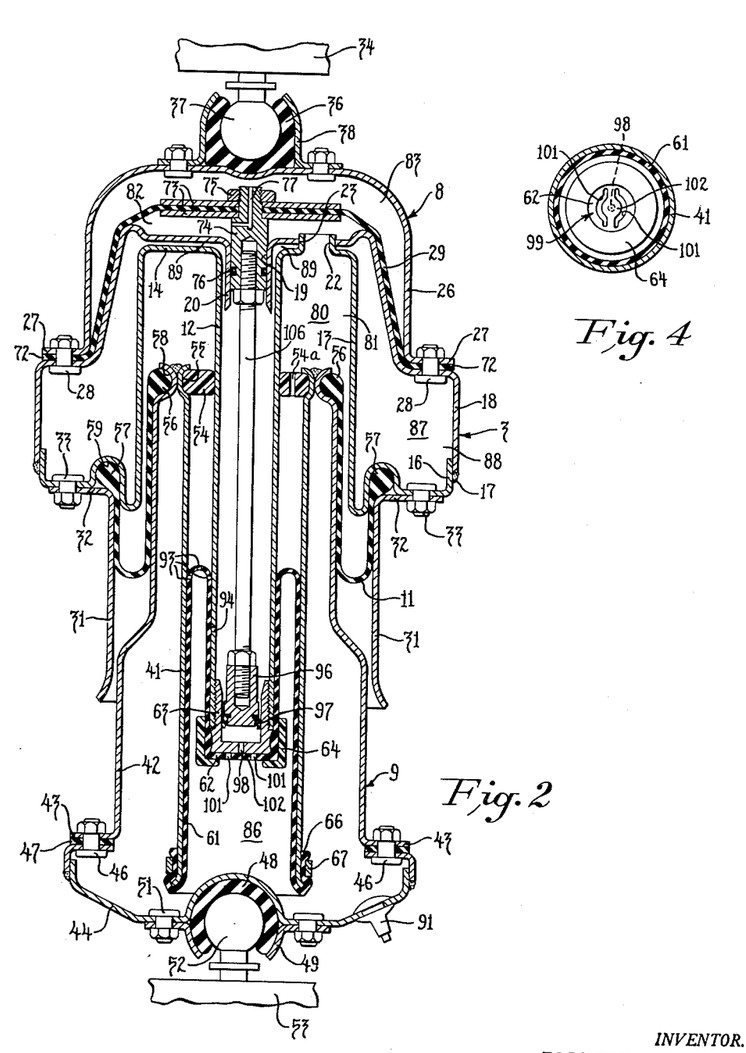
FIG. 2 is a view similar to FIG. 1 but showing another position of operation on the fluid spring.
FIG. 4 is a cross-sectional view taken on line 4—4 in FIG. 1.

The ring 54 is constructed to permit the free passage of air between opposite sides of the ring. As shown in FIGS. 1 and 2, this may be accomplished by a plurality of openings 54a.

The housings 8 and 9 are further connected together by an elongated tubular diaphragm 61 having a closed end 62 and providing a flexible wall between the housings. More specifically, the closed end portion 62 of the diaphragm fits over a plug 63 threaded into the lower end of the tubular member 12 and is held in position by a clamping ring 64 which is pressed over the diaphragm and may be made of some synthetic material, such as nylon. This member also acts as an anti-friction element to engage the diaphragm upon misalignment and relative movement of the upper and lower housings 8 and 9 and prevents excessive wear. The open end of the diaphragm 61 is larger than the closed end and a portion 66 is folded over a flared lower end of the tubular member 41 and held in position by a retainer ring 67.

The diaphragm 29 is positioned in the upper housing member 8 and is generally cup shaped with its lip or flange 72 bolted between the inverted cups 18 and 26. This not only provides an air tight seal between the areas within the air spring and the atmosphere, but also acts to position the diaphragm. A pair of plates 73 are disposed on opposite sides of the diaphragm and are held in position between a guide member 74 and a nut 75. The guide member 74 is provided with a seal 76 which engages the interior walls of the collar 20 and includes a passage 77 which permits communication with opposite sides of the diaphragm 29.

The diaphragms 11 and 61 are made of some material, such as rubber, molded over a reinforcing cord or fabric material so that the diaphragms may flex and yet maintain their shape without undue stretching. However, the diaphragm 29 is made of rubber-like material so that in addition to flexing, it may stretch.

The structure described thus far affords a load-supporting chamber for maintaining the sprung and unsprung members 34 and 53 in spaced relation, a supply chamber which contains air for delivery to the load chamber when the need occurs and an exhaust chamber which receives surplus air from the load chamber. The load-supporting chamber designated generally by 80 is of complex shape and has a portion 81 formed in the upper housing 8 between the tubular members 12 and 13. The bottom of the chamber is defined by the diaphragms 11 and 61. The upper portion of the chamber communicates with a cavity 82 at the underside of the diaphragm 29 through collars 22. The cavity 82 is in further communication with the cavity 83 formed by the cup 26 through the restricted passage 77. In this manner, the portion 81 and the cavities 82 and 83 form the load-supporting chamber.

The high pressure chamber 86 is formed in the lower housing member and is separated from the load chamber 80 by a flexible wall formed by the diaphragm 61. The low pressure chamber 87 includes not only an annular cavity 88 formed by the inverted cup 18 and the tubular member 13 but also the interior of tube 12. Constant communication of the tube 12 and the cavity 88 is afforded by a passage 89 formed by the spacing between end walls 14 and the inverted cup 18.

In order to maintain the spring members 34 suspended relative to the unsprung member 53, it is necessary to introduce a quantity of air into the suspension unit 3. This can be accomplished by a conventional air filler valve 91 of the type used in automotive tires and mounted in an appropriate location, such as, in the cover 44.

In operation, the housings 8 and 9 are maintained in spaced relation to each other by the pressurized load-supporting chamber 80. The volume of the chamber remains constant except during oscillation of the spring as a vehicle moves on a road. When the static load on a vehicle is changed, for example, by increasing or decreasing the number of passengers, the pressure must be changed correspondingly in the chamber 80 to maintain its volume and to maintain the housings 8 and 9 at a relatively constant spacing. The variation in air pressure in chamber 80 is under the control of a valve means which includes passage means in the form of a plurality of small ports 93 formed in the diaphragm 61 and passage means afforded by a small port 94 in the tube 12. As shown in FIG. 1, the ports 93 are covered by the tube 41 and the port 94 is covered by the diaphragm 61. This prevents communication of air between load chamber 80 and supply chamber 86. However, as the upper housing 8 moves toward housing 9 as shown in FIG. 2, one or more of the ports 93 are exposed to place chambers 86 and 80 in communication with each other. If the pressure in chamber 86 is relatively high, air will pass to chamber 80 and increase the pressure so that housings 8 and 9 will move away from each other and result in closing of the ports by the tube 41. When the housings 8 and 9 move away from each other from the position shown in FIG. 1, diaphragm 61 will uncover port 94 and a relatively high pressure in chamber 80 will cause air to enter the tube 12 and the annular cavity 88. When sufficient air has escaped from chamber 80, the housings 8 and 9 will approach each other and resume the relative positions shown in FIG. 1.

The valve mechanism is actuated in response to relative movement of the housings 8 and 9. Such movement results upon a change in static loading or when dynamic loads are imposed on either the body or wheels of a vehicle as it passes over a road. In the latter case, the resulting movement of the housings is rapid and consequently, the ports 93 and 94 may open frequently but for very short periods of time. In addition to this, the ports 93 and 94 are relatively small so that extremely small quantities of air pass between the chambers as the housings oscillate relative to each other. On the other hand, a change in static loading causes the ports 93 or 94 to remain open until sufficient air is supplied to or exhausted from the chamber 80 to establish the required pressure for supporting the load and for maintaining the ports 93 and 94 closed. Thus far mechanism and operation has been described for maintaining housings 8 and 9 at a uniform relative position independent of the load on the spring. This is of particular importance where a pair of springs are utilized at opposite ends of a vehicle axle. Under such conditions, the major portion of the vehicle load can be positioned at one side of the vehicle but opposite sides of the body will remain equally spaced from corresponding points on the axle or from the surface of the road. This characteristic is frequently referred to as leveling and is obtained with the self-contained units of the described embodiment without employing complex leveling valves or air conduits between the chambers.

The interchange of air between the chambers upon actuation of the valve means is dependent on air pressure in the supply chamber 86 being equal to or greater than the pressure in load chamber 80 which in turn should be equal to or greater than the pressure in the exhaust or low pressure chamber 87. This condition is established by a pump mechanism which includes a piston 96 supported to reciprocate in the pump cylinder afforded by the tubular member 12. The piston 96 is provided with a one-way seal 97, that is, a seal which during reciprocation of the piston will permit air to pass from a point above the piston to a point below the piston but not in the reverse direction. Upon reciprocation of the piston, air below the piston is compressed and forced through a passage 98 in the plug 63. This is effective to actuate a valve 99 which as shown in FIG. 4 is formed by a pair of slots 101 in the closed end 62 of the diaphragm 61. The portion 102 between the slots is deflected by the air from passage 98 which enters the chamber 86 through slots 101. As the piston 96 reaches the end of its downward stroke, the pressure in chamber 86 presses the portion 102 against the passage 98 to close it and prevent air from returning from the supply chamber 86 to the pump cylinder 12.

The pump piston 96 is reciprocated by means of the elastic diaphragm 29 which normally rests in engagement with the perforated wall 18. When sudden loads are imposed on either the structure 34 or 53 to move housings 8 and 9 toward each other, the pressure is increased in the portion 81 of the chamber 80. Because of the communication afforded by the openings at 22, the increased pressure is imposed on the underside of the diaphragm 29 and since passage 77 permits only restricted air flow, the diaphragm stretches upwardly to assume a position as shown in FIG. 2 and move the guide 74 upwardly. The guide 74 and diaphragm 29 will return to a normal position due to the elasticity of the diaphragm as the pressures equalize at opposite sides of the diaphragm when air flows through the restricted passage 77 from chamber portion 82 to portion 83. The diaphragm also will return downwardly with even greater force if the housings 8 and 9 should immediately move away from each other. This greatly reduces the pressure in chamber portions 81 and 82 and the greater pressure in chamber 83 forces the diaphragm downwardly with considerable force. The downward movement of the diaphragm 29 and guide 74 is transmitted to the pump piston by a piston rod 106. Consequently, as the diaphragm 29 is deflected upwardly, air passes the piston seal 97 and enters the portion of the cylinder 12 below the piston. Upon return movement of the diaphragm, air is forced into the chamber 86 to increase the pressure therein. Movement of the diaphragm 29 to actuate the pump will take place each time the load is suddenly increased on either the structure 34 or 53. Ordinarily rapid relative movement of the housings due to dynamic loads is relied upon to actuate the pump since changes in static loads are usually so gradual that air passes through passage 77 to chamber 83 without displacing the pump actuating diaphragm 29.

To summarize the structure described, the suspension unit 3 includes a deformable load-supporting chamber 80, a supply chamber 86 and an exhaust chamber 87. Also incorporated in the structure is a pump mechanism including a piston 96 which is reciprocated by the movement of a diaphragm 29 to receive air from the exhaust chamber 87 and to deliver it to the supply chamber 86. Air in the supply chamber 86 is delivered to the load chamber 80 under the control of a valve mechanism including ports 93 and 94 which also meters air from the load chamber 80 to the exhaust chamber 87.

Operations of the air spring 3 will be visualized best by considering a typical installation on an automobile wherein the units replace the conventional metallic springs as shown in FIGS. 5 and 6. Under such conditions, the springs must be capable of accommodating a wide range of static and dynamic loads. Changes in static loading will occur when there is a change in the number of passengers or when a passenger changes his position within the vehicle. Dynamic loads imposed on the suspension system will vary, dependent on the contour of the road and the speed at which the vehicle is being driven. For purpose of discussion, the movement of the vehicle body and axle toward each other will be referred to as jounce, and movement away from each other will be referred to as rebound.

Operation of the units will be considered initially under conditions in which the pressures in each of the chambers 80, 86 and 87 are equal and the loaded vehicle is suspended by the units in their normal position as shown in FIG. 1. Under such conditions, the moving vehicle will undergo jouncing and rebounding which will cause the housings 8 and 9 to move relative to each other. Jounces and rebounds under smooth road conditions will be of small amplitude so that the ports 93 and 94 of the valve mechanism will remain covered. However, when the amplitude increases, jouncing will open ports 93 to permit communication of chambers 80 and 86 and rebounding will open port 94 so that chambers 80 and 87 communicate. In the initial stages of operation, the pressures in the chambers will be equal and there will be no interchange of air. When a jounce exceeds the normal smooth ride amplitude, the pressure in portion 81 of chamber 80 will increase due to the decrease in chamber volume. The increased pressure will be imposed on the elastic diaphragm 29 to raise the pump piston 96. As the pressures are equalized at opposite sides of the diaphragm 71 because of air flow through passage 77 or because rebound decreases the pressure at the underside of the diaphragm, the piston 96 is forced downwardly and air is forced from chamber 87 to chamber 86. This decreases the pressure in chamber 87 and increases the pressure in chamber 86. In this manner, the pressure in chamber 86 becomes higher than the pressure in chamber 80 which in turn is higher than the pressure in chamber 87. Under such conditions, jouncing and rebounding of sufficient amplitude results in opening of the ports 93 and 94. However, the ports are relatively small and since they are uncovered for a relatively short period of time, such minute quantities of air pass from one chamber to another that the pressure relationship of one chamber to another is not appreciably affected.

Assuming now that the static load on any one of the spring units is changed, for example, by a passenger moving from a position at one side of the vehicle to a position at the other side, the load will be increased on one suspension unit and will be decreased on the other. When the load is increased, the housings 8 and 9 move toward each other because the pressure in chamber 80 is not sufficient to support the load. This causes the diaphragm 61 to move or roll relative to the tubular member 41 so that one or more of the ports 93 are uncovered as shown in FIG. 2. Since the pressure in chamber 86 is higher than in chamber 80, air will pass through the ports to increase the pressure in chamber 80. As the pressure increases, the housings 8 and 9 will be forced apart relative to each other until the ports are closed by the tubular member 41. The suspension unit will now be supporting a larger load, but the spacing of the balls 37 and 52 will be the same as it was prior to the increase in static load. In the same manner, when the static load is decreased at the other side of the vehicle and on the associated unit, the housings 8 and 9 will move apart relative to each other thereby causing the diaphragm 61 to roll relative to the tubes 41 and 12 so that port 94 is uncovered. Because the pressure in chamber 80 is higher than that required to support the load and higher than the pressure within the pump cylinder 12, air will pass through the port 94 to the low pressure or exhaust chamber 87 until the pressure in chamber 80 decreases sufficiently to permit the housings 8 and 9 to return to their normal position which closes port 94. The suspension unit now will be supporting a smaller load, but the spacing of balls 37 and 52 will be the same as it was with the higher static load. The same relative positions of the housings will be maintained for all loads as the vehicle moves over the road and establishes high pressure in supply chamber 86. The static loading may increase over a very wide range with the same dimensional relationship being maintained between the balls 34 and 53.

Adequate suspension is afforded even under unusual conditions when the vehicle is temporarily subjected to extremely large loads. In this case, the movement of housings 8 and 9 toward each other results in exposing ports 93 so that high pressure air passes from supply chamber 86 to load chamber 80. The load may be so large that the air pressure in chambers 80 and 86 becomes equalized but not effective to move the housings 8 and 9 apart to close ports 93. As the vehicle moves, the pump will continue to deliver air to chamber 86 until the pressure in chamber 87 becomes very low and the chambers 80 and 86 can remain in constant communication to support the load. When the vehicle is stopped and normal loading is re-established, housings 8 and 9 will move apart due to the high pressure so that ports 93 will be closed and subsequently, ports 94 will open to exhaust air from chamber 80 to chamber 87.

When air is first added to the suspension by way of filler valve 91, the load on the unit will be such that ports 93 will be open and air will be received by both chambers 80 and 86 until sufficient pressure is supported to close port 93. Subsequent addition of air will increase the pressure in the supply chamber only. Consequently, air may be added to a pair of suspension units associated with a single axle until the pressure reaches some selected value. Thereafter, operation of the vehicle will admit air to the exhaust chamber from the load chamber. The pressure lost by the load chamber will be replaced by air from the supply chamber if the need occurs. Once a quantity of air has been introduced into the spring unit 3, it acts a self-contained air suspension system which maintains a sufficient pressure in a load-supporting chamber to maintain a wide range of loads at the same mean height. Air need not be added or bled from the unit and as a consequence, moisture will not be accumulated in the unit. This keeps maintenance at a minimum and obviates the need to make provisions for ejecting moisture.

An important aspect of the suspension unit is that all of the operating parts, such as, the pump and valving are enclosed and protected from foreign material and moisture. Furthermore, if any of the parts fail, for example, the pump, the diaphragm 29 or 61 or the valve means, the unit remains operable in the sense that air is continually available to support the load and none escapes from the unit. The unit can fail only if a leak is established in the outer walls of the housings 8 and 9, in the diaphragm 11 or the filler valve 91. When several suspension units are used on a vehicle, the failure of any one of the units leaves all the remaining units operable and the possibility of disabling a vehicle is consequently kept to a minimum.

It should be understood that it is not intended to limit the invention to the above described forms and details, and that the invention includes such other forms and modifications as are embraced by the scope of the appended claims.

It is claimed and desired to secure by Letters Patent:

1. In a self-contained fluid spring having a pair of relative movable housings forming a closed fluid container, a cylinder rigidly disposed in one of said housings, a flexible wall connected to said cylinder and to the other of said housings to form a pair of fluid chambers at opposite sides of said flexible wall, said flexible wall including portions engaged with the walls of said cylinder and the walls of the other of said housings, a first control port formed in said flexible wall and normally being closed by said walls of the other of said housings to isolate said chambers from each other, a second control port formed in said cylinder and normally being closed by said flexible wall to isolate one of said chambers from said cylinder, said first control port being opened upon movement of said housings toward each other to place said chambers in fluid communication with each other, said second port being opened upon relative movement of said housings away from each other to discharge fluid under pressure from said one chamber to said cylinder, and pump means for receiving fluid from said cylinder and delivering it under pressure to the other of said chambers.

2. In a self-contained air spring having a pair of relatively movable housings forming a closed fluid container, a cylinder rigidly disposed in one of said housings, a generally tubular diaphragm having one end connected to the outer surface of said cylinder and the other end connected to an adjacent inner wall of the other of said housings and forming a load-supporting chamber and a supply chamber at opposite sides of said diaphragm, a first control port formed in said flexible wall and normally being closed by said inner wall to isolate said chambers from each other, a second control port formed in said cylinder and normally being closed by said flexible wall to isolate said load-supporting chamber from said cylinder, said first control port being opened upon movement of said housings toward each other to admit air from said supply chamber to said load-supporting chamber, said second port being opened upon relative movement of said housings away from each other to discharge air under pressure from said load-supporting chamber to said cylinder, and piston means disposed in said cylinder for reciprocable movement to force air therefrom under pressure to said supply chamber.

3. An air suspension mechanism adapted to be disposed between sprung and unspring structures, the combination of an upper housing and a lower housing, one of said housings forming a cylinder, a movable wall connected to said housings to form a fluid-tight container, a flexible diaphragm forming a wall between said cylinder and the other of said housings, said walls and said one housing forming a load-supporting chamber containing fluid for supporting said housings relative to each other, said diaphragm and said other of said housings forming a high pressure fluid chamber, said one housing presenting a low pressure chamber therein, passage means between said cylinder and said high and low pressure chambers, piston means in said cylinder movable in response to relative movement of said housings to force fluid from said low pressure chamber to said high pressure chamber, and valve means operable between positions admitting fluid from said high pressure chamber to said load-supporting chamber upon movement of said housings toward each other and exhausting fluid from said load-supporting chamber to said low pressure chamber upon housings oscillate relative to each other. On the other hand, a change in static loading causes the ports 93 or 94 to remain open until sufficient air is supplied to or exhausted from the chamber 80 to establish the required pressure for supporting the load and for maintaining the ports 93 and 94 closed. Thus far mechanism and operation has been described for maintaining housings 8 and 9 at a uniform relative position independent of the load on the spring. This is of particular importance when a pair of springs are utilized at opposite ends of a vehicle axle. Under such conditions, the major portion of the vehicle load can be positioned at one side of the vehicle but opposite sides of the body will remain equally spaced from corresponding points on the axle or from the surface of the road. This characteristic is frequently referred to as leveling and is obtained with the self-contained units of the described embodiment without employing complex leveling valves or air conduits between the chambers.

The interchange of air between the chambers upon actuation of the valve means is dependent on air pressure in the supply chamber 86 being equal to or greater than the pressure in load chamber 80 which in turn should be equal to or greater than the pressure in the exhaust or low pressure chamber 87. This condition is established by a pump mechanism which includes a piston 96 supported to reciprocate in the pump cylinder afforded by the tubular member 12. The piston 96 is provided with a one-way seal 97, that is, a seal which during reciprocation of the piston will permit air to pass from a point above the piston to a point below the piston but not in the reverse direction. Upon reciprocation of the piston, air below the piston is compressed and forced through a passage 98 in the plug 63. This is effective to actuate a valve 99 which as shown in FIG. 4 is formed by a pair of slots 101 in the closed end 62 of the diaphragm 61. The portion 102 between the slots is deflected by the air from passage 98 which enters the chamber 86 through slots 101. As the piston 96 reaches the end of its downward stroke, the pressure in chamber 86 presses the portion 102 against the passage 98 to close it and prevent air from returning from the supply chamber 86 to the pump cylinder 12.

The pump piston 96 is reciprocated by means of the elastic diaphragm 29 which normally rests in engagement with the perforated wall 18. When sudden loads are imposed on either the structure 34 or 53 to move housings 8 and 9 toward each other, the pressure is increased in the portion 81 of the chamber 80. Because of the communication afforded by the openings at 22, the increased pressure is imposed on the underside of the diaphragm 29 and since passage 77 permits only restricted air flow, the diaphragm stretches upwardly to assume a position as shown in FIG. 2 and move the guide 74 upwardly. The guide 74 and diaphragm 29 will return to a normal position due to the elasticity of the diaphragm as the pressures equalize at opposite sides of the diaphragm when air flows through the restricted passage 77 from chamber portion 82 to portion 83. The diaphragm also will return downwardly with even greater force if the housings 8 and 9 should immediately move away from each other. This greatly reduces the pressure in chamber portions 81 and 82 and the greater pressure in chamber 83 forces the diaphragm downwardly with considerable force. The downward movement of the diaphragm 29 and guide 74 is transmitted to the pump piston by a piston rod 106. Consequently, as the diaphragm 29 is deflected upwardly, air passes the piston seal 97 and enters the portion of the cylinder 12 below the piston. Upon return movement of the diaphragm, air is forced into the chamber 86 to increase the pressure therein. Movement of the diaphragm 29 to actuate the pump will take place each time the load is suddenly increased on either the structure 34 or 53. Ordinarily rapid relative movement of the housings due to dynamic loads is relied upon to actuate the pump since changes in static loads are usually so gradual that air passes through passage 77 to chamber 83 without displacing the pump actuating diaphragm 29.

To summarize the structure described, the suspension unit 3 includes a deformable load-supporting chamber 80, a supply chamber 86 and an exhaust chamber 87. Also incorporated in the structure is a pump mechanism including a piston 96 which is reciprocated by the movement of a diaphragm 29 to receive air from the exhaust chamber 87 and to deliver it to the supply chamber 86. Air in the supply chamber 86 is delivered to the load chamber 80 under the control of a valve mechanism including ports 93 and 94 which also meters air from the load chamber 80 to the exhaust chamber 87.

Operations of the air spring 3 will be visualized best by considering a typical installation on an automobile wherein the units replace the conventional metallic springs as shown in FIGS. 5 and 6. Under such conditions, the springs must be capable of accommodating a wide range of static and dynamic loads. Changes in static loading will occur when there is a change in the number of passengers or when a passenger changes his position within the vehicle. Dynamic loads imposed on the suspension system will vary, dependent on the contour of the road and the speed at which the vehicle is being driven. For purpose of discussion, the movement of the vehicle body and axle toward each other will be referred to as jounce, and movement away from each other will be referred to as rebound.

Operation of the units will be considered initially under conditions in which the pressures in each of the chambers 80, 86 and 87 are equal and the loaded vehicle is suspended by the units in their normal position as shown in FIG. 1. Under such conditions, the moving vehicle will undergo jouncing and rebounding which will cause the housings 8 and 9 to move relative to each other. Jounces and rebounds under smooth road conditions will be of small amplitude so that the ports 93 and 94 of the valve mechanism will remain covered. However, when the amplitude increases, jouncing will open ports 93 to permit communication of chambers 80 and 86 and rebounding will open port 94 so that chambers 80 and 87 communicate. In the initial stages of operation, the pressures in the chambers will be equal and there will be no interchange of air. When a jounce exceeds the normal smooth ride amplitude, the pressure in portion 81 of chamber 80 will increase due to the decrease in chamber volume. The increased pressure will be imposed on the elastic diaphragm 29 to raise the pump piston 96. As the pressures are equalized at opposite sides of the diaphragm 71 because of air flow through passage 77 or because rebound decreases the pressure at the underside of the diaphragm, the piston 96 is forced downwardly and air is forced from chamber 87 to chamber 86. This decreases the pressure in chamber 87 and increases the pressure in chamber 86. In this manner, the pressure in chamber 86 becomes higher than the pressure in chamber 80 which in turn is higher than the pressure in chamber 87. Under such conditions, jouncing and rebounding of sufficient amplitude results in opening of the ports 93 and 94. However, the ports are relatively small and since they are uncovered for a relatively short period of time, such minute quantities of air pass from one chamber to another that the pressure relationship of one chamber to another is not appreciably affected.

Assuming now that the static load on any one of the spring units is changed, for example, by a passenger moving from a position at one side of the vehicle to a position at the other side, the load will be increased on one suspension unit and will be decreased on the other. When the load is increased, the housings 8 and 9 move toward each other because the pressure in chamber 80 is not sufficient to support the load. This causes the diaphragm 61 to move or roll relative to the tubular member 41 so that one or more of the ports 93 are uncovered as shown in FIG. 2. Since the pressure in chamber 86 is higher than in chamber 80, air will pass through the ports to increase the pressure in chamber 80. As the pressure increases, the housings 8 and 9 will be forced apart relative to each other until the ports are closed by the tubular member 41. The suspension unit will now be supporting a larger load, but the spacing of the balls 37 and 52 will be the same as it was prior to the increase in static load. In the same manner, when the static load is decreased at the other side of the vehicle and on the associated unit, the housings 8 and 9 will move apart relative to each other thereby causing the diaphragm 61 to roll relative to the tubes 41 and 12 so that port 94 is uncovered. Because the pressure in chamber 80 is higher than that required to support the load and higher than the pressure within the pump cylinder 12, air will pass through the port 94 to the low pressure or exhaust chamber 87 until the pressure in chamber 80 decreases sufficiently to permit the housings 8 and 9 to return to their normal position which closes port 94. The suspension unit now will be supporting a smaller load, but the spacing of balls 37 and 52 will be the same as it was with the higher static load. The same relative positions of the housings will be maintained for all loads as the vehicle moves over the road and establishes high pressure in supply chamber 86. The static loading may increase over a very wide range with the same dimensional relationship being maintained between the balls 34 and 53.

Adequate suspension is afforded even under unusual conditions when the vehicle is temporarily subjected to extremely large loads. In this case, the movement of housings 8 and 9 toward each other results in exposing ports 93 so that high pressure air passes from supply chamber 86 to load chamber 80. The load may be so large that the air pressure in chambers 80 and 86 becomes equalized but not effective to move the housings 8 and 9 apart to close ports 93. As the vehicle moves, the pump will continue to deliver air to chamber 86 until the pressure in chamber 87 becomes very low and the chambers 80 and 86 can remain in constant communication to support the load. When the vehicle is stopped and normal loading is re-established, housings 8 and 9 will move apart due to the high pressure so that ports 93 will be closed and subsequently, ports 94 will open to exhaust air from chamber 80 to chamber 87.

When air is first added to the suspension by way of filler valve 91, the load on the unit will be such that ports 93 will be open and air will be received by both chambers 80 and 86 until sufficient pressure is supported to close port 93. Subsequent addition of air will increase the pressure in the supply chamber only. Consequently, air may be added to a pair of suspension units associated with a single axle until the pressure reaches some selected value. Thereafter, operation of the vehicle will admit air to the exhaust chamber from the load chamber. The pressure lost by the load chamber will be replaced by air from the supply chamber if the need occurs. Once a quantity of air has been introduced into the spring unit 3, it acts a self-contained air suspension system which maintains a sufficient pressure in a load-supporting chamber to maintain a wide range of loads at the same mean height. Air need not be added or bled from the unit and as a consequence, moisture will not be accumulated in the unit. This keeps maintenance at a minimum and obviates the need to make provisions for ejecting moisture.

An important aspect of the suspension unit is that all of the operating parts, such as, the pump and valving are enclosed and protected from foreign material and moisture. Furthermore, if any of the parts fail, for example, the pump, the diaphragm 29 or 61 or the valve means, the unit remains operable in the sense that air is continually available to support the load and none escapes from the unit. The unit can fail only if a leak is established in the outer walls of the housings 8 and 9, in the diaphragm 11 or the filler valve 91. When several suspension units are used on a vehicle, the failure of any one of the units leaves all the remaining units operable and the possibility of disabling a vehicle is consequently kept to a minimum.

It should be understood that it is not intended to limit the invention to the above described forms and details, and that the invention includes such other forms and modifications as are embraced by the scope of the appended claims.

It is claimed and desired to secure by Letters Patent:

1. In a self-contained fluid spring having a pair of relative movable housings forming a closed fluid container, a cylinder rigidly disposed in one of said housings, a flexible wall connected to said cylinder and to the other of said housings to form a pair of fluid chambers at opposite sides of said flexible wall, said flexible wall including portions engaged with the walls of said cylinder and the walls of the other of said housings, a first control port formed in said flexible wall and normally being closed by said walls of the other of said housings to isolate said chambers from each other, a second control port formed in said cylinder and normally being closed by said flexible wall to isolate one of said chambers from said cylinder, said first control port being opened upon movement of said housings toward each other to place said chambers in fluid communication with each other, said second port being opened upon relative movement of said housings away from each other to discharge fluid under pressure from said one chamber to said cylinder, and pump means for receiving fluid from said cylinder and delivering it under pressure to the other of said chambers.

2. In a self-contained air spring having a pair of relatively movable housings forming a closed fluid container, a cylinder rigidly disposed in one of said housings, a generally tubular diaphragm having one end connected to the outer surface of said cylinder and the other end connected to an adjacent inner wall of the other of said housings and forming a load-supporting chamber and a supply chamber at opposite sides of said diaphragm, a first control port formed in said flexible wall and normally being closed by said inner wall to isolate said chambers from each other, a second control port formed in said cylinder and normally being closed by said flexible wall to isolate said load-supporting chamber from said cylinder, said first control port being opened upon movement of said housings toward each other to admit air from said supply chamber to said load-supporting chamber, said second port being opened upon relative movement of said housings away from each other to discharge air under pressure from said load-supporting chamber to said cylinder, and piston means disposed in said cylinder for reciprocable movement to force air therefrom under pressure to said supply chamber.

3. An air suspension mechanism adapted to be disposed between sprung and unspring structures, the combination of an upper housing and a lower housing, one of said housings forming, a cylinder, a movable wall connected to said housings to form a fluid-tight container, a flexible diaphragm forming a wall between said cylinder and the other of said housings, said walls and said one housing forming a load-supporting chamber containing fluid for supporting said housings relative to each other, said diaphragm and said other of said housings forming a high pressure fluid chamber, said one housing presenting a low pressure chamber therein, passage means between said cylinder and said high and low pressure chambers, piston means in said cylinder movable in response to relative movement of said housings to force fluid from said low pressure chamber to said high pressure chamber, and valve means operable between positions admitting fluid from said high pressure chamber to said load-supporting chamber upon movement of said housings toward each other and exhausting fluid from said load-supporting chamber to said low pressure chamber upon movement of said housings away from each other, said valve means being operable upon movement of said diaphragm in response to relative movement of said housings.

4. In a self-contained air spring having a pair of relatively movable housings forming a closed fluid container, a closed cylinder rigidly disposed in one of said housings, a generally tubular diaphragm having one end connected to the outer surface of said cylinder and the other end connected to an adjacent inner wall of said other housing and forming a supply chamber and load-supporting chamber at opposite sides of said diaphragm, a first control port formed in said diaphragm and normally being closed by said wall of said other housing to isolate said chambers from each other, a second control port formed in said cylinder and normally being closed by said flexible wall to isolate one of said chambers from said cylinder, said first control port being opened upon movement of said housings toward each other to admit air from said supply chamber to said load-supporting chamber, said second port being opened upon relative movement of said housings away from each other to discharge air under pressure from said load-supporting chamber to said cylinder, piston means disposed in said cylinder for reciprocable movement to force air therefrom under pressure to said supply chamber, and actuating means disposed in said load-supporting chamber and being responsive to relative movement of said housings to reciprocate said piston.

5. A fluid suspension mechanism adapted for disposition between sprung and unsprung portions of a vehicle, the combination of a pair of housing elements, wall means between said housing elements for forming a collapsible fluid chamber, said housing elements forming a low pressure chamber and a high pressure chamber, respectively, pump means disposed in said housing elements and being movable to receive fluid from said low pressure chamber and deliver it to said high pressure chamber, valve means movable between a position placing said high pressure chamber and collapsible chamber in communication with each other and a position placing said low pressure chamber in communication with said collapsible chamber, said valve means being movable in response to changes in relative position of said housing elements, actuating means connected to said pump means for moving the latter including a deformable wall dividing said collapsible chamber, restricted passage means placing opposite sides of said wall in communication with each other, said wall being movable in one direction upon collapsing movement of said chamber to increase the pressure at one side of said wall and in the other direction upon fluid flow from said one side of said wall through said passage means to equalize pressures at opposite sides of said wall.

6. An air suspension mechanism adapted to be disposed between sprung and unsprung structures, the combination of an upper housing and a lower housing, one of said housings including a cylinder, a first movable wall connected to said housings to form a fluid tight container, a second movable wall between said cylinder and the other of said housings, said movable walls and said one housing forming a load-supporting chamber containing fluid for supporting said housings relative to each other, said second movable wall and said other of said housings forming a high pressure fluid chamber, said one housing presenting a low pressure chamber therein, passage means between said cylinder and said high and low pressure chambers, piston means in said cylinder movable in response to relative movement of said housings to force fluid from said low pressure chamber to said high pressure chamber, first valve means formed by said second movable wall and being closed by engagement with the other of said housings to isolate said high pressure chamber from said load-supporting chamber and being movable to an open position communicating the latter chambers, and second valve means formed by said cylinder and being closed by engagement with said second movable wall to isolate said load-supporting chamber from said low pressure chamber and being movable to an open position placing the latter chambers in communication with each other, said first and second valve means normally being maintained in their closed position and being operable in response to the relative positions of said housings to move one of said valve means to its open position.

7. An air suspension mechanism adapted to resiliently support a load-bearing structure, the combination of a pair of housings, a pair of cylinders rigidly connected to said housings, respectively, and supported axially therein and in telescoping relation to each other, a first flexible wall connected to both of said housings to form a fluid tight container, a second flexible wall connected to the outer surface of one of said cylinders and the inner surface of the other of said cylinders and forming a high pressure chamber at one side thereof, said first and second flexible walls forming a load-supporting chamber in said container, one of said housings having wall portions forming a low pressure chamber communicating with the associated one of said cylinders, pump means slidably supported in said one cylinder and being movable in response to relative movement of said housings to receive fluid under pressure from said low pressure chamber and deliver it to said high pressure chamber, exhaust valve means including a passage in said one cylinder communicating with said load-supporting chamber and being opened and closed upon engagement and disengagement of the outer surface of said one cylinder and said second flexible wall, delivery valve means including a passage in said second flexible wall between said high pressure and load-supporting chambers and being opened and closed upon engagement and disengagement of said second flexible wall and the inner surface of the other of said cylinders, said exhaust and delivery valve means normally being closed to maintain a predetermined pressure in said load-supporting chamber and one of said valve means being opened while the other remains closed to change the pressure in said load-supporting chamber in response to relative movement of said upper and lower housings.

8. In a self-contained air spring having a pair of relatively movable housings, a flexible wall connected to said pair of housings to form a closed fluid container, a cylinder disposed axially in said housings and being rigidly supported to one of said housings for movement therewith, a generally tubular diaphragm having one end connected to the outer surface of said cylinder and the other end connected to an adjacent inner wall of said other housing and forming a supply chamber and load-supporting chamber at opposite sides of said diaphragm, a first control port formed in said diaphragm, a second control port formed in said cylinder, said diaphragm having portions intermediate its opposite ends in engagement with the inner wall of said other housing and the outer wall of said cylinder to normally and simultaneously maintain said ports closed, said first control port being opened upon movement of said housings toward each other to admit air from said supply chamber to said load-supporting chamber, said second port being opened upon relative movement of said housings away from each other to discharge air under pressure from said supply chamber to said cylinder, piston means disposed in said cylinder for reciprocable movement to force air therefrom under pressure to said supply chamber, means for reciprocating said piston comprising an elastic wall disposed in said load chamber and dividing the latter into a pair of chambers, and restricted passage means in said elastic wall, said elastic wall being distorted in one direction upon movement of said housings toward each other and returning to its original position upon passage of air through said restricted passage to equalize pressures at opposite sides of said diaphragm, said elastic diaphragm being connected to said piston for moving the latter.

9. A fluid suspension mechanism adapted for disposition between sprung and unsprung structures, the combination of a pair of housing elements, a flexible wall joining said housing elements and forming a collapsible fluid container, said housing elements presenting a low pressure chamber and a high pressure chamber in said container, valve means movable in response to relative movement of said housing elements between a position placing said high pressure chamber and collapsible container in communication with each other and a position placing said low pressure chamber in communication with said collapsible container, reciprocating pump means disposed in said housing elements and being movable to receive fluid from said low pressure chamber and deliver it to said high pressure chamber, an elastic wall having its perimeter connected to the walls of one of said housing elements in said collapsible container, passage means placing opposite sides of said elastic wall in constant communication with each other, said wall being movable in one direction upon collapsing movement of said chamber to increase the pressure at one side of said wall and in the other direction upon return flow of fluid from said one side of said wall through said passage means to equalize pressures at opposite sides of said wall, and means connecting said elastic wall and pump means for actuating the latter.

10. An air spring having relatively movable housings forming a closed fluid container, wall means forming a load-supporting and a supply chamber in said container, passage means between said supply chamber and said load-supporting chamber, valve means controlling fluid flow in said passage means, said valve means normally being closed to isolate said supply and load-supporting chamber from each other and opening in response to relative movement of said housings toward each other to admit fluid under pressure from said supply chamber to said load-supporting chamber, means for delivering air to said supply chamber including a cylinder supported on one of said housings for movement therewith, a piston disposed in said cylinder for reciprocable movement to force air therefrom under pressure to said supply chamber, means for reciprocating said piston comprising an elastic wall disposed in said load chamber and dividing the latter into a pair of chambers, restricted passage means in said elastic wall, said elastic wall being distorted in one direction upon movement of said housings toward each other and returning to its original position upon passage of air through said restricted passage to equalize pressures at opposite sides of said diaphragm, said elastic diaphragm being connected to said piston for moving the latter.

11. In an air spring for a vehicle comprising a first housing connected to the body of a vehicle, a second housing connected to the ground engaging gear of a vehicle, a cylinder disposed axially in said housings and being rigidly supported to said first housing for movement therewith, a generally tubular diaphragm having one end connected to the outer surface of said cylinder and the other end connected to an adjacent inner wall of said second housing and forming separate supply and load-supporting chambers at opposite sides of said diaphragm, a first control port formed in said flexible wall, a second control port formed in said cylinder, said flexible wall having portions intermediate its opposite ends normally in engagement with the inner wall of said second housing and the outer wall of said cylinder to simultaneously maintain said ports closed, said housings normally being disposed in a position in which said first and second ports are closed and being movable toward each other in response to an increase in static load to open said first port while said second port remains closed and away from each other in response to a decrease in static load to open said second port while said first port remains closed to maintain a pressure in said load-supporting chamber proportional to the static load, piston means disposed in said cylinder for reciprocable movement to force air therefrom under pressure to said supply chamber, and actuating means disposed in said load-supporting chamber and being responsive to relative movement of said housings upon a change in dynamic load to reciprocate said piston.

12. A self-contained air spring system for a vehicle comprising a pair of relatively movable housings forming a closed fluid container, one of said housings being adapted for connection to the body of a vehicle and the other of said housings being adapted for connection to the axle of the vehicle, said housing each including stationary wall means within said container, a flexible wall disposed in said container and being connected to said stationary wall means and forming a load-bearing chamber and a supply chamber at opposite sides of said wall, said load-bearing chamber containing a supply of air under pressure proportional to the load on said housings to maintain said housings in predetermined spaced relation to each other, valve means controlling the delivery of air from said supply chamber to said load-bearing chamber and the exhaust of air from the latter, said valve means presenting a supply port in said flexible wall and an exhaust port in said stationary wall means, said supply and exhaust ports normally being closed by said stationary wall and said flexible wall, respectively, said flexible wall being movable to open said supply port upon movement of said housings toward each other to deliver air under pressure from said supply chamber to said load-bearing chamber and to open said exhaust port upon movement of said housings away from each other to discharge air from said load-bearing chamber.

13. In an air spring adapted for supporting a sprung portion of a vehicle relative to an unsprung portion, first and second housings connected to said sprung and unsprung portions, respectively, first and second cylinders connected to said housings respectively, and being disposed in telescopic relation to each other, a first flexible wall connected to said first housing and said second housing to form a closed fluid container, a second flexible wall being connected to said first and second cylinders to form a supply chamber at one side thereof, said first and second flexible walls forming a load-bearing chamber at the other side of said second flexible wall, valve means including a supply port formed in said second flexible wall and normally being closed by said second cylinder to prevent communication between said chambers, an exhaust port formed by said first cylinder and normally being closed by said second flexible wall to prevent communication between said load chamber and said first cylinder, said housings being movable toward each other upon an increase in load on said sprung portion of said vehicle to open said supply port for delivery of air from said supply chamber to said load chamber to increase the pressure in the latter, said housings being movable away from each other upon a decrease in load on said sprung portion of said vehicle to open said exhaust port for discharge of air from said load chamber to said first cylinder to decrease the pressure in said load chamber.

14. In an air spring adapted for supporting a sprung portion of a vehicle relative to an unsprung portion, first and second housings connected to said sprung and unsprung portions, respectively, first and second cylinders connected to said housings, respectively, and being disposed in telescopic relation to each other, a first flexible wall connected to said first housing and said second cylinder to form a closed fluid container, a second flexible wall being connected to said first and second cylinders to form a supply chamber at one side thereof, said first and second flexible walls forming a load-bearing chamber at the other side of said second flexible wall, valve means including a supply port formed in said second flexible wall and normally being closed by said second cylinder to prevent communication between said chambers, an exhaust port formed by said first cylinder and normally being closed by said second flexible wall to prevent communication between said load chamber and said first cylinder, said housings being movable toward each other upon an increase in load on said sprung portion of said vehicle to open said supply port for delivery of air from said supply chamber to said load chamber to increase the pressure in the latter, said housings being movable away from each other upon a decrease in load on said sprung portion of said vehicle to open said exhaust port for discharge of air from said load chamber, piston means disposed in said first cylinder for reciprocating movement, a perforated wall disposed in said load-bearing chamber, an elastic diaphragm disposed in said load-bearing chamber and normally being engaged with said perforated wall, said elastic wall being deformable away from said perforated wall upon relatively rapid movement of said housings toward each other increasing the pressure in said load chamber and at one side of said elastic diaphragm, a restricted passage means in said elastic diaphragm permitting restricted flow of fluid to its other side to return said elastic wall into engagement with said perforated wall, said elastic wall being connected to said piston to reciprocate the latter to deliver air under pressure from said first cylinder to said supply chamber.

15. In a fluid suspension mechanism adapted to support variable loads at a mean height, a deformable fluid containing housing presenting a pair of spaced supports, fixed wall means in said housing forming a low pressure chamber therein, flexible wall means forming a variable volume chamber at one side of said flexible wall means and a high pressure chamber at the other side thereof, said variable volume chamber containing fluid under pressure to maintain said supports in spaced relation, pump means connected to both of said supports to deliver fluid from said low pressure chamber to said high pressure chamber upon movement of said supports from their normal spacing, and valve means movable between positions admitting fluid under pressure from said high pressure chamber at one side of said flexible wall to said variable volume chamber at the other side of said flexible wall and from said variable volume chamber to said low pressure chamber, said valve means being movable in response to a change in the spacing between said supports.

References Cited in the file of this patent
UNITED STATES PATENTS

| | | |
|---|---|---|
| 1,289,082 | Bangs | Dec. 31, 1918 |
| 1,373,711 | Bourne | Apr. 5, 1921 |
| 2,436,573 | Heynes | Feb. 24, 1948 |
| 2,616,687 | Butterfield | Nov. 4, 1952 |
| 2,946,582 | Martin | July 26, 1960 |